WIDE BAND COUPLING CIRCUIT

Filed March 5, 1963

INVENTORS.
Harry R. Foster
&
Elmo E. Crump
BY
Arthur A. March
ATTORNEY.

United States Patent Office 3,258,712

Patented June 28, 1966

3,258,712

WIDE BAND COUPLING CIRCUIT

Harry R. Foster, Montville, and Elmo E. Crump, Caldwell, N.J., assignors to Ohmega Laboratories, Pine Brook, N.J., a corporation of New Jersey Filed Mar. 5, 1963, Ser. No. 262,997
1 Claim. (Cl. 330—166)

This invention relates to coupling circuits such as are used to connect the output electrodes of one amplifying device to the input electrodes of a second amplifying device, and in particular it relates to a coupling circuit capable of transmitting electrical signals having a wide range of frequencies.

This invention differs from coupling circuits of the prior art by using an impedance and an autotransformer as a means of extending operation of the circuit to lower frequencies. This provides in effect a coupling impedance at the lower frequencies, while at the same time retaining the advantages of an autotransformer at higher frequencies.

The invention will be described in greater detail in the following specification together with the drawings in which.

Figure 1:
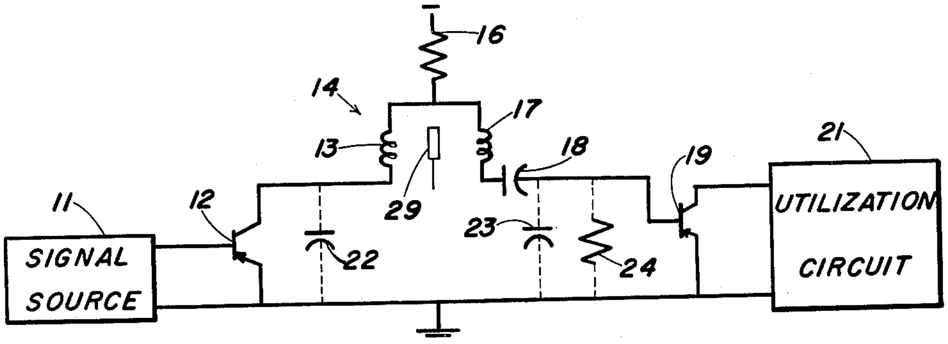
FIG. 1 shows a simplified schematic diagram of the coupling circuit of the invention together with amplifying devices to which it is connected.

In FIG. 1 suitable electrical signals are provided by a signal source 11 and are connected to the base and emitter input electrodes of a transistor 12 which serves as an amplifying device. The transistor is connected as a grounded-emitter amplifier and the output signal is derived from its collector. One terminal of the primary section 13 of an autotransformer 14 is connected to the collector of transformer 12 and the other terminal of the primary section 13 is connected to a suitable supply voltage source to provide operating power for the transistor. The secondary section 17 of the autotransformer 14 is connected from the junction of the primary 13 and the load resistor 16 to a blocking capacitor 18 which serves to prevent direct current signals from passing through the circuit. This capacitor is connected to the base of a second amplifying transistor 19, which is also arranged as a grounded-emitter amplifier, the output signal of which is connected to a utilization circuit 21 in which the amplified signals may be used as desired.

In addition to the aforementioned components the circuit of FIG. 1 also has other components which are present to a greater or less degree in any electronic device and are therefore considered as inherent components. Of these inherent components only the most important ones are shown. These are the inherent output capacitance of transistor 12 indicated in dotted form and identified by reference character 22 and the input capacitance 23 and the input resistance 24, both indicated in dotted form, of the second transistor 19. As is well known, these inherent components, and particularly the capacitances 22 and 23, largely determine the maximum possible operating frequency of the circuit. Good design can reduce these capacitances to fairly low values but can never eliminate them completely. Heretofore circuits coupled by autotransformers have been capable of operating well at relatively high frequencies because they have kept the inherent capacitances 22 and 23 separate instead of adding them together. However, autotransformer-coupled circuits have not heretofore been able to amplify low frequencies because of the low impedance of the autotransformer at low frequencies. In the circuit of the present invention the constructional simplicity of autotransformer-coupled circuits is retained, but the added load resistor 16 provides extra low frequency response; resulting in a wide band coupling circuit.

Figure 2:
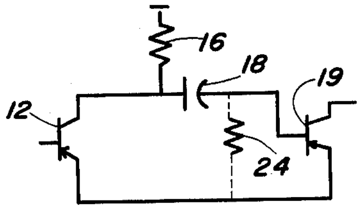
FIG. 2 shows the equivalent circuit of the coupling network of FIG. 1 at low frequencies.

Operation of the coupling circuit of FIG. 1 at low and medium frequencies is the same as if the circuit had the configuration shown in FIG. 2. In FIG. 2 the same collector load resistor is connected to the collector of transistor 12 but the autotransformer 14 has no little effect on the operation of the circuit that it can be considered nonexistent and thus the effect is the same as if the coupling capacitor 18 were connected directly to the emitter of transistor 12. At low and medium frequencies the effects of the inherent capacitances 22 and 23 are so small as to be negligible and therefore these components are not shown in FIG. 2. However, the effect of resistor 24, which is the equivalent input resistance of transistor 19, is not dependent upon frequency and is therefore shown just as in FIG. 1. This resistance limits the maximum resistance of the load resistor 16 since it is effectively connected in parallel therewith. The effect of the coupling capacitor 19 may be considered negligible for medium frequencies, but at low frequencies the impedance of this capacitor becomes more and more significant and it completely prevents direct current and the very lowest frequencies of alternating current from being transmitted from the transistor 12 to the transistor 19.

Figure 3:
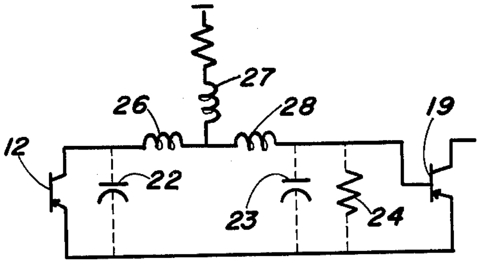
FIG. 3 shows the equivalent circuit of the coupling network of FIG. 1 at high frequencies.

FIG. 3 shows a circuit which is equivalent to the circuit of FIG. 1 so far as high frequency components of the signal are concerned. In place of the autotransformer 14, the equivalent inductances 26, 27 and 28 are shown. The actual magnitudes of these inductances are dependent upon the construction of the autotransformer 14; i.e., upon certain fixed factors, such as the number of turns in the coils 13 and 17 and the spacing of these coils. In addition the exact values of these inductances are also determined by the setting of a single core, which is indicated by reference character 29 in FIG. 1. Thus in the simple autotransformer circuit it is possible by means of a single adjustable core 29 to set the inductances 26–28 of the equivalent circuit in FIG. 3 to values which will achieve the optimum signal transfer for the particular inherent capacitances 22 and 23 that happen to be present. This provides a simple means of controlling the effective collector load of the first transistor 12 to maintain uniform response of the circuit from very low frequencies to very high frequencies.

Figure 4:
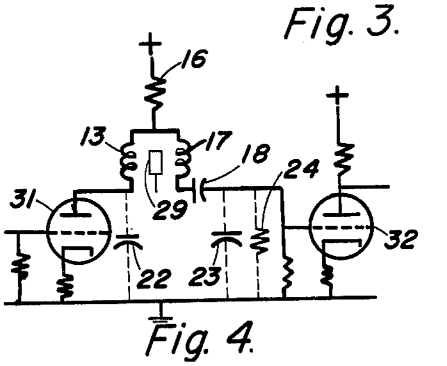
FIG. 4 shows the circuit of FIG. 1 modified to accommodate vacuum tubes in place of transistors.

FIG. 4 shows the same coupling circuit as FIG. 1, but instead of connecting two transistors together, the circuit of FIG. 4 comprises a different type of active element, vacuum tubes 31 and 32. The input signal is applied between the grid of tube 31 and ground and is amplified therein in the usual way. The coupling circuit, itself, comprises the same elements with the same reference numbers as in FIG. 1, although these elements may have different impedance values to accommodate the requirements of vacuum tubes which, as is well known, are somewhat different from the requirements of transistors.

The inherent capacitances 22 and 23 and the input impedance 24 of FIG. 4 are similar to the correspondingly numbered components of FIGS. 1 to 3, so that there is no need to repeat the operating characteristics of the coupling circuit.

While this invention has been described in terms of a specific embodiment, it will be recognized by those skilled in the art that modifications may be made therein without department from the true scope of the invention as defined by the following claim.

What is claimed is:

A wide-band amplifier comprising: a first amplifying device having an output circuit and inherent capacitance thereacross; a second amplifying device having an input circuit with inherent capacitance thereacross; and a wide-band circuit coupling said output circuit to said input circuit and comprising an autotransformer having first and second coil sections magnetically coupled together and each having first and second terminals, respectively, the first terminals of both of said sections being directly connected together to form a common terminal; a direct connection from the second terminal of said first section to said output circuit; a substantially zero signal-impedance connection joining said second terminal of said second section to said input circuit; and a load resistance consisting solely of an unbypassed resistor connected to said common terminal to be in series with each of said first and second sections, and said autotransformer and inherent capacitances forming a load-impedance for said first amplifying device, the value of said impedance being substantially uniform from a low frequency at which the inductive effect of said autotransformer is substantially negligible to high frequencies at which the inductive effect of said autotransformer is an important component of the value of said impedance.

References Cited by the Examiner

UNITED STATES PATENTS

| | | | |
|---|---|---|---|
| 2,244,022 | 6/1941 | Rust et al. | 330—167 X |
| 2,321,291 | 6/1943 | Grundmann | 330—167 X |
| 3,029,400 | 4/1962 | Nelson | 330—167 X |
| 3,034,069 | 5/1962 | Fathauer | 330—165 |

ROY LAKE, *Primary Examiner.*

NATHAN KAUFMAN, *Examiner.*